Figure 1:
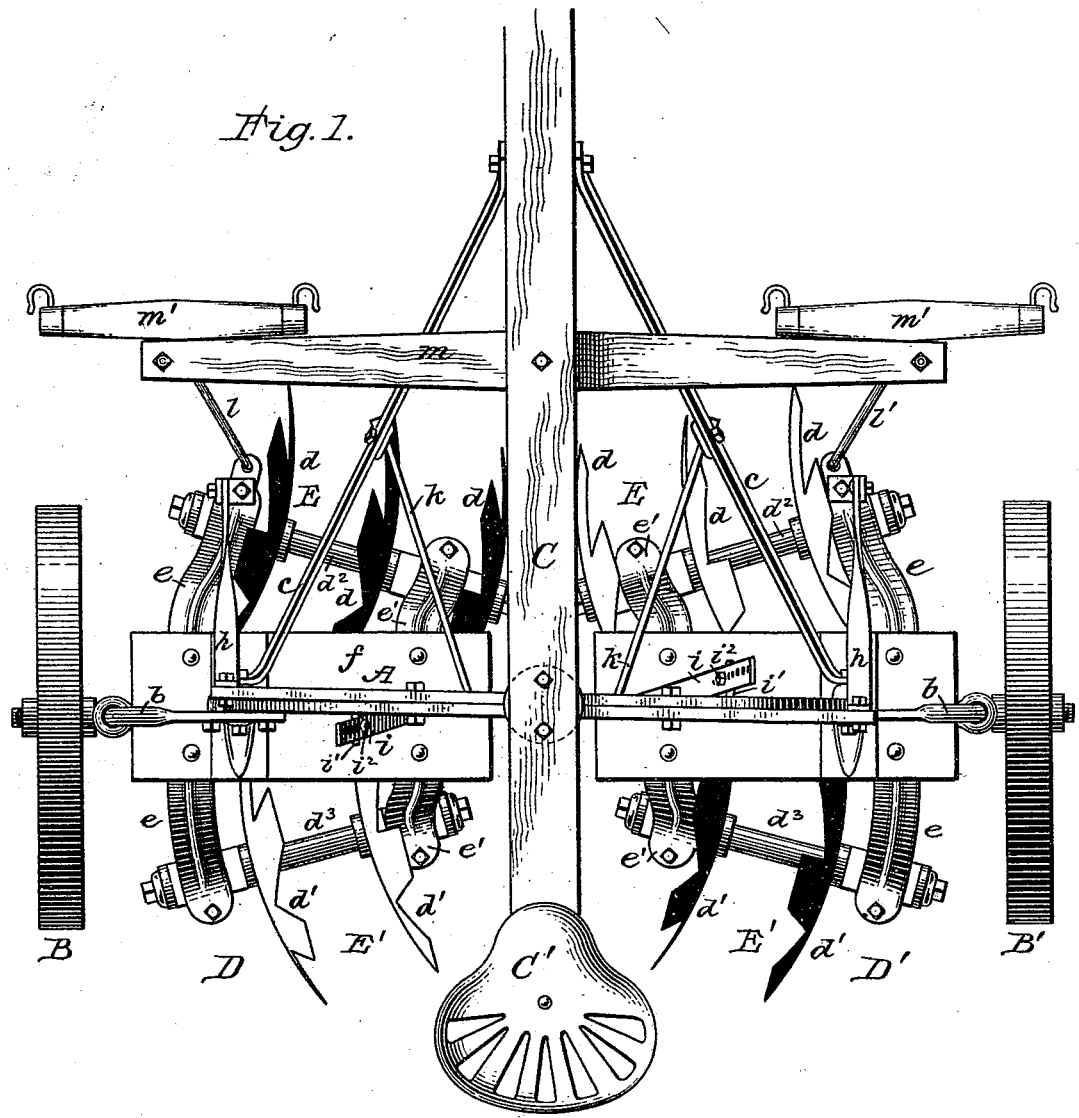

(No Model.) 4 Sheets—Sheet 1.

G. M. CLARK.
CULTIVATOR.

No. 514,210. Patented Feb. 6, 1894.

Attest:
Philip F. Larner
Nowell Bartle

Inventor:
George Marshall Clark
By [signature]
Attorney

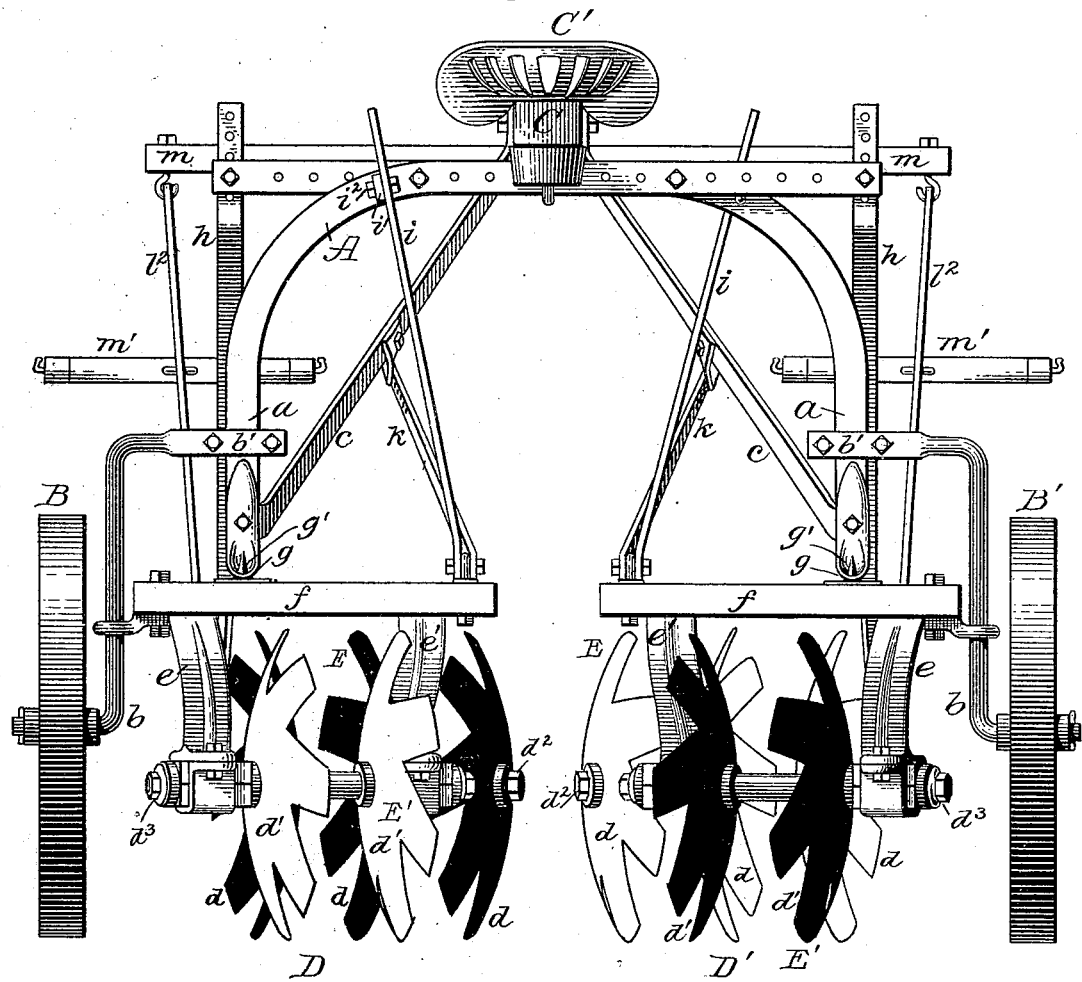

(No Model.) 4 Sheets—Sheet 3.
G. M. CLARK.
CULTIVATOR.
No. 514,210. Patented Feb. 6, 1894.
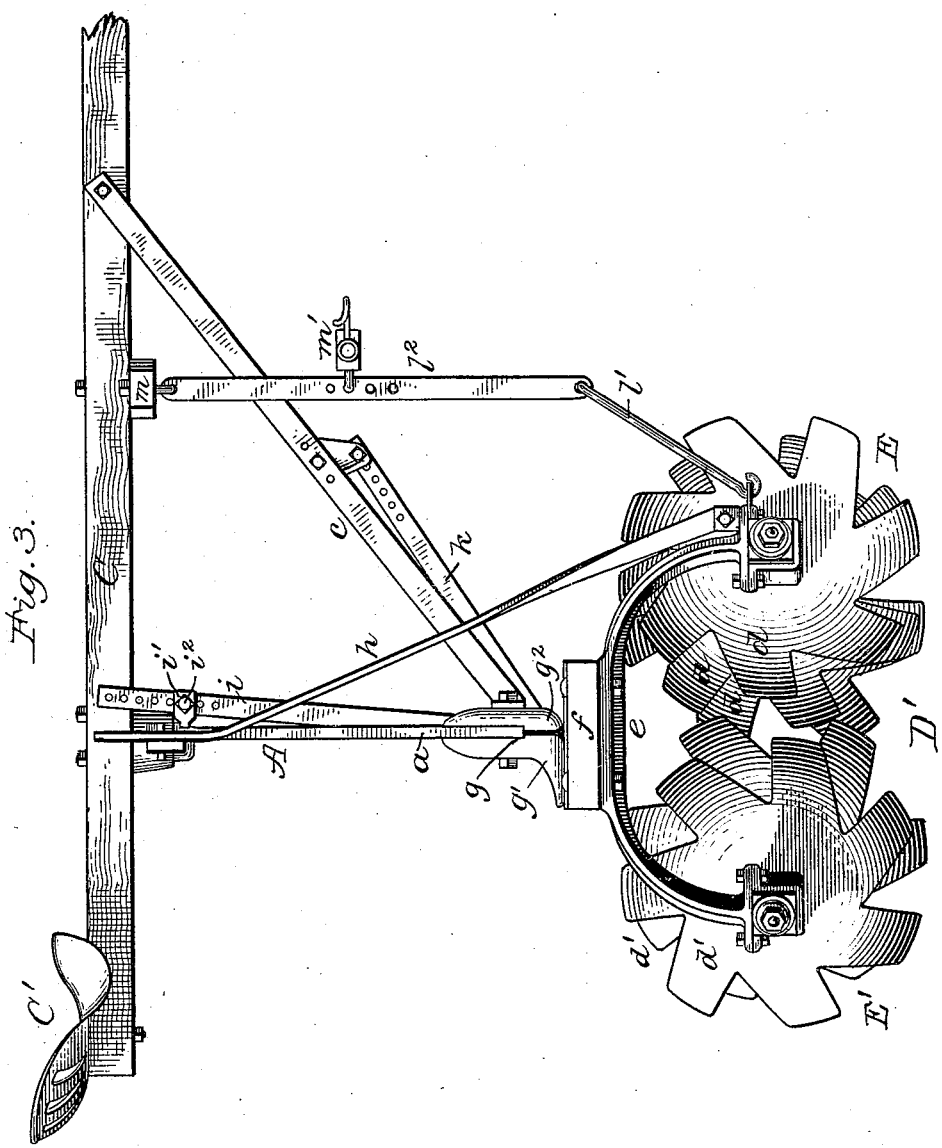

(No Model.) 4 Sheets—Sheet 4.

G. M. CLARK.
CULTIVATOR.

No. 514,210. Patented Feb. 6, 1894.

Attest:
Philip F. Larned
Howell Battt

Inventor:
George Marshall Clark
By M. C. Mott
Attorney

THE NATIONAL LITHOGRAPHING COMPANY,
WASHINGTON, D. C.

United States Patent Office.

GEORGE MARSHALL CLARK, OF HIGGANUM, CONNECTICUT.

CULTIVATOR.

SPECIFICATION forming part of Letters Patent No. 514,210, dated February 6, 1894.

Application filed November 1, 1892. Serial No. 450,618. (No model.)

*To all whom it may concern:*

Be it known that I, GEORGE MARSHALL CLARK, of Higganum, (township of Haddam,) in the county of Middlesex and State of Connecticut, have invented certain new and useful Improvements in Cultivators; and I do hereby declare that the following specification, taken in connection with the drawings furnished and forming a part thereof, is a clear, true, and complete description of my invention.

Machines embodying the main features of my present invention, so far differ from any others in this general line known to me, that I feel warranted in calling them, cultivators of a novel type; in that, said cultivators are the first, which embody two complex gangs of soil working disks, each complex gang including two separate gangs of reversibly operative disks, which are organized in two gang frames, endwise to each other, (or on the same lateral line,) and so organized with a main frame, as to afford between the inner, or coincident ends of the complex gangs, ample space to admit of working at both sides of a row of young plants, such as cotton, corn, &c.

The two gangs of disks in each complex gang are reversely operative, because they are reversely mounted on axles which are reversely inclined to the line of draft; and therefore, in each complex gang, one gang of disks effects an outward displacement of soil, and the other an inward displacement.

I do not, of course, claim to have been the first to organize in one gang frame, either two or four reversely operative gangs of concavo convex disks, such organizations having been disclosed and suggested in Letters Patent No. 185,209, dated December 12, 1876, as improvements in wheel harrows, which were only adapted to the working of soil preparatory to planting, and which were totally unfit for, and incapable of performing the duty of my machines, in working narrow strips of planted soil on both sides of rows of growing plants, and without injury thereto.

One short disk gang in my cultivators being in advance of the other, which is longer a narrow strip of soil between rows of growing plants is worked laterally to and fro, in a manner specially conducive to the cutting out of heavy weeds, grass, &c., and a clearance of soil from their roots, and also to an effective cutting and mangling of their stalks. The disks are as usual, concavo convex, and while they may be of the usual form, having annular cutting edges, the best results will accrue from the use of sharp edged bladed disks, as heretofore patented to me. These complex gangs may be organized with main frames which are varied in form and construction, but the best results will be afforded by the use of an arched frame, as in ordinary straddle row cultivators having legs to which the complex gangs are more or less flexibly coupled, and I will describe my invention, as embodied by me in a straddle row cultivator, in which I have so organized the complex gangs, that either may be longitudinally inclined for causing the disks at the inner ends of the gangs to operate more or less deeply, than the disks at the outer ends; and, still further, so that the front gang of disks in each complex gang, may be elevated or depressed for causing said disks to operate more or less deeply than the disks in the rear gang.

In my machines, the disks may or may not perform carrying duty, as when on the road or moving from field to field.

In one form of my machines, the axles of the disk gangs are permanently inclined with reference to each other, and hence the disks cannot well be relied upon for the performance of carrying or transit duty, and therefore in such machines, suitable carrying wheels are employed, these being adjustably connected with the legs of the arched frame, so as to admit of the location of the gangs at any desired horizontal plane for gaging their working contact with the soil. In another form of my machines, the disk gangs are so organized in their gang frame, that the axles of both disk gangs may be adjusted parallel with each other, and at right angles to the line of draft, thus enabling the disks to perform full carrying duty.

After fully describing my invention in connection with the drawings, the features deemed novel, will be duly specified in the several clauses of claim hereunto annexed.

Figure 5:
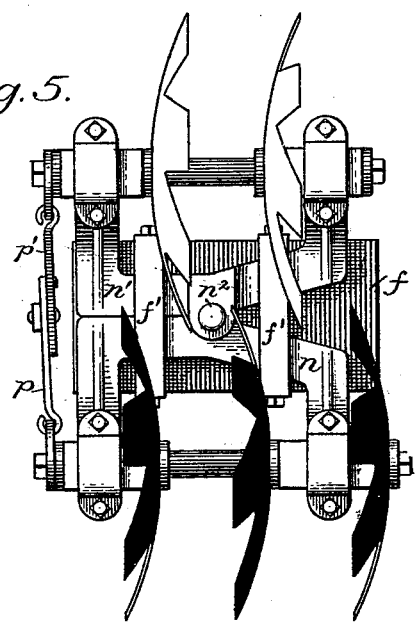
Figure 4:
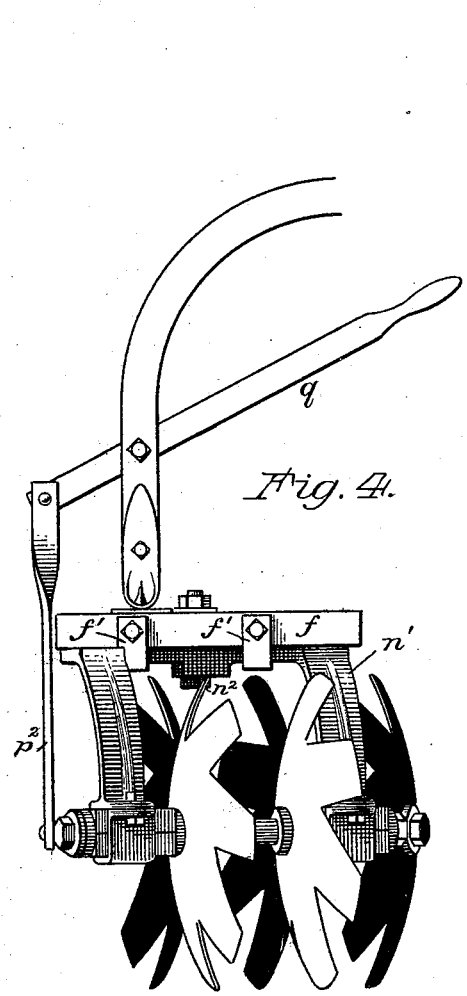
Figure 6:
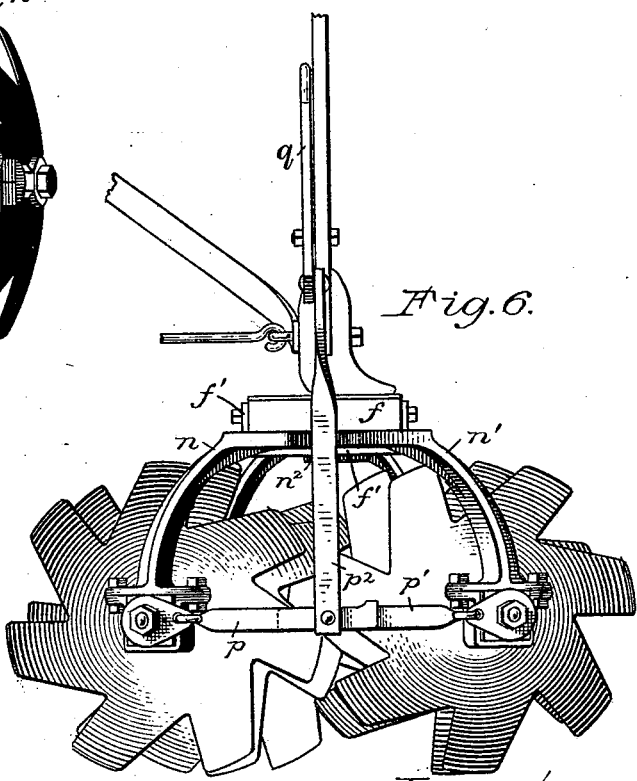

Referring to the drawings; Figure 1, in plan view, illustrates one of my machines in an approved form. Fig. 2, is a rear elevation of the same. Fig. 3, is a side view of the same, without the carrying wheels. Fig. 4, illustrates in rear view, one-half of a machine wherein the two disk gangs, in each complex gang are adapted to be so varied in their inclination, that the disks may be relied upon for carrying duty. Fig. 5, illustrates the complex gang of Fig. 4, in an inverted position, and with the gang axles parallel with each other. Fig. 6, illustrates the outer end of said complex gang in elevation, with the gang axles inclined to each other, as for field service.

In my machine, the main frame may be varied in its character, but as illustrated the main frame A, is of the well known arched or ∩-shaped form, having legs a, a, and constructed of metal in two parts, united at the top by means of bolts occupying some of several holes shown, thus providing as heretofore, for adjustably varying the distance between the legs, and correspondingly varying the width of unworked soil at each side of a row of growing plants.

A pair of carrying wheels B, B', provided with bent axles b, b, are each coupled to an appropriate leg a, of the main frame, by means of a clamp at b', thus providing for variations in the elevation of the frame, above the tread of the carrying wheels.

A pole C, is rigidly clamped centrally to the top of the frame, and it has at its rear end, a driver's seat C'. The legs a, a, of the frame, are braced by means of upwardly and forwardly extended brace rods or bars c, c, which at the upper ends, are bolted firmly to the sides of the pole. From this wheeled frame, as thus described, two complex gangs D, and D', occupy the same lateral line, and are suspended in such a manner, that by vertically adjusting the carrying wheels with respect of the frame, said gangs may be carried either wholly above the surface of the ground, or permitted to variably engage with the ground or soil which is to be worked, in a manner common to wheel cultivators, as will hereinafter be more fully explained in connection with other capacities for adjustment, for securing variations in the operation of the soil working devices. Each of these complex gangs D or D', includes or embodies, two gangs of soil working disks E, E', one being in front of the other, so as to operate in the same path. Any desired number of disks may be employed, but, as here shown, in each instance, the front disk gang E, embodies three concavo convex disks $d, d, d$, the rear disk gang having but two disks $d', d'$, and although all of these disks are of the same size, it is sometimes desirable to have in one gang larger disks than in the other. As hereinbefore indicated, these disks may be of the usual annular edged variety, but the best results accrue from the use of bladed disks, as shown, which embody improvements heretofore patented to me.

The disk gangs, are reversely operative, in that the disks $d$, in the front gangs have their concave sides away from the pole, so as to effect an outward displacement of soil, while the disks $d'$, of the rear gangs, have their concave sides toward the pole, so as to effect an inward displacement of soil. The axles $d^2, d^3$, of the disk gangs, are inclined reversely, and their journals occupy boxes carried in arched standards or hangers $e, e'$, which are in turn secured to a gang frame plank $f$. The four reversely operative disk gangs, thus organized in two gang frames, constitute two complex gangs, each of which is connected to an appropriate leg $a$, of the frame A, by means of a ball and socket coupling as at $g$, the rear half $g'$, of the socket, having an extended free bearing on top of the gang plank $f$, near its outer end, and the front half at $g^2$, being rounded at its base, as clearly indicated in Fig. 3, thus providing for a flexible union of the complex gangs to the main frame, and also permitting the gang frame to be tilted axially; or in other words, so as to permit the front disk gang to be raised or lowered, as by means of an extensible adjusting link $h$, which extends from the outer journal box of the front disk gang, upwardly to a laterally projecting portion of the top of the main frame, and it is connected therewith, by a bolt occupying one of the several holes provided for its reception. Each gang frame near its inner end, is also suspended from the main frame, by means of an extensible link $i$, extending from the gang frame to the top of the arched main frame, and coupled thereto by means of a lug at $i'$, and a suitable bolt $i^2$, which occupies one of the several holes in the link, thus providing for variably inclining the disk gangs longitudinally, and in a vertical plane, and causing the inner disks to work more or less deeply in the soil, than the other disks. The inner ends of the gang frames, are also coupled to the brace bars $c, c$, by means of extensible links $k, k$, each extending forwardly and upwardly, and secured at its forward end to a brace bar, by means of a bolt occupying one of the several holes in the link, so that the latter serves as a supplemental draft bar for the inner end of the gang frame. The main draft bars or links $l, l'$, are connected to the gang frames at the boxes at their outer front ends, and said links are each coupled to a link $l^2$, suspended from an appropriate outer end of a double tree $m$. The single trees $m', m'$, are in each instance connected with said pendent links $l^2$ below the double tree, as clearly indicated in Fig. 3. The complex gangs are also capable of being adjusted angularly to the line of draft, by means of the extensible supplemental draft bars, or links $k, k$, thus enabling the inclination of the axles of the disk gangs to be varied with reference to the line of draft. As, for instance, if the inner end of a complex gang be inclined forwardly, the inclination of the front disk gang axle will have been lessened, and that of the rear disk gang axle increased, and a reversed variation in these inclinations of the gang axles, will occur, should the inner ends of the complex gangs be inclined rearwardly, thus enabling the soil working duty to be varied, when heavy weed cutting is to be performed.

One of my machines constructed and organized as thus far described, is capable of performing good soil working duty, and it is highly efficient in working row planted fields which are beset with heavy growths of stalky weeds, and grasses, the disks of the front gangs cutting them up by the roots and laying them flatly, and fully exposed to the disks of the rear gangs, which not only work the soil oppositely from the working of the front gang, but they also promptly so cut the weeds, as to leave them in a condition quite unfavorable to their recovery as growing weeds. The described capacities for adjustment, enable the disk gangs to be effectively operated under the varied conditions incident to the cultivation of row planted fields.

It will be obvious that so far as relates to actual service in the field, the carrying wheels may oftentimes be dispensed with, and some of my complex gang machines have no carrying wheels, because they are so organized that the disks can be relied upon for performing the sole carrying duty, as illustrated in Figs. 4, 5 and 6.

In this machine, the complex gangs have as before described, two reversely operative disk gangs, but the axles of the latter, instead of being fixedly mounted with relation to each other, as in the machine first described, are capable of being adjusted from their inclined positions, to positions at right angles to the line of draft. In other words, the boxes of each disk gang shaft, are mounted in a standard frame $n$, or $n'$. Each standard frame is centrally pivoted as at $n^2$, to the gang frame plank $f$, so as to freely swing between the under side of the plank, and suitable guide plates $f'$, secured crosswise of the plank. The boxes of the two gangs at their outer ends, are connected by a pair of knuckle joint arms or links $p, p'$, which at their hinged ends are connected with a vertical link $p^2$, suspended from the outer end of a lever $q$, which on being depressed at its inner end, so lifts the connected ends of the knuckle joint arms $p, p'$, as to pull the outer ends of the two gang shafts toward each other, for placing them parallel with each other, and at right angles to the line of draft, and thus enabling them to do simple carrying duty.

With the co-operating bladed disk gangs thus rendered adjustable as to inclination, they may be set so as to do but little soil working, while effectually operating in the destruction of weeds, especially when the disks of the two gangs overlap each other, so as to co-operate in the chopping of heavy weeds, which may be lifted from the ground by the disks of the front gang. When the axles of the two disk gangs are fixedly mounted with reference to each other, as shown in Fig. 3, there is an overlapping of each other by the inner disks, and in some cases when specially large bladed disks are used, the outer disks are also overlapped.

Having thus described my invention, I claim as new and desire to secure by Letters Patent—

1. In a cultivator, the combination substantially as hereinbefore described, of a pair of complex gangs, each embodying in one gang frame, two gangs of reversely operative bladed disks.

2. In a straddle row cultivator, the combination substantially as hereinbefore described, of an arched main frame, and complex gangs organized with gang frames which are connected to the main frame, each of said complex gangs, including two reversely operative soil working disk gangs.

3. In a straddle row cultivator, the combination substantially as hereinbefore described, of an arched main frame, a pair of carrying wheels attached to, and vertically adjustable on the legs of said frame, and a pair of complex gangs connected to the frame, and each gang embodying reversely operative soil working disks.

4. In a straddle row cultivator, the combination substantially as hereinbefore described, of an arched or main frame; a pair of complex gangs connected with said frame, and on the same lateral line, each complex gang embodying two reversely operative disk gangs in the same path, and vertically adjustable with relation to each other, for causing the disks of one gang to operate more deeply in the soil, than the disks of the other gang.

5. In a straddle row cultivator, the combination substantially as hereinbefore described, of a main or arched frame, complex gangs, connected to said frame, each gang embodying two reversely operative disk gangs, in one gang frame, which is vertically adjustable at the inner end, for enabling the inner disks of each disk gang to operate more or less deeply in the soil, than the disks at the outer ends.

6. In a straddle row cultivator, the combination substantially as hereinbefore described, of an arched main frame; four reversely operative bladed disk gangs organized in two complex gangs, each of which is coupled at its outer end to an appropriate leg of the main frame, and at the inner end is coupled to said frame by an adjustable link for enabling the complex gang to be inclined either rearwardly or forwardly, and thereby to cause one of the disk gangs in either complex gang to be set at a greater inclination, than the other disk gang.

GEORGE MARSHALL CLARK.

Witnesses:
WELLINGTON H. WART,
WILLIAM H. BROWN.